US008296707B2

(12) United States Patent
Amundson et al.

(10) Patent No.: US 8,296,707 B2
(45) Date of Patent: Oct. 23, 2012

(54) IMPLEMENTING SPARE LATCH PLACEMENT QUALITY DETERMINATION

(75) Inventors: Michael David Amundson, Oronoco, MN (US); Craig Marshall Darsow, Rochester, MN (US); Eldon Gale Nelson, Rochester, MN (US); Dennis Martin Rickert, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 12/948,165

(22) Filed: Nov. 17, 2010

(65) Prior Publication Data

US 2012/0124541 A1 May 17, 2012

(51) Int. Cl.
*G06F 17/50* (2006.01)
*G06F 9/455* (2006.01)

(52) U.S. Cl. ........ 716/122; 716/118; 716/119; 716/132; 716/135

(58) Field of Classification Search ........................ None
See application file for complete search history.

(56) References Cited

U.S. PATENT DOCUMENTS

| 5,087,839 | A  | * | 2/1992 | Whittaker et al. | 326/40  |
| 5,087,953 | A  | * | 2/1992 | Whittaker et al. | 257/203 |
| 7,100,140 | B2 | * | 8/2006 | Amundson et al.  | 716/104 |
| 7,383,523 | B2 | * | 6/2008 | Inoue            | 327/141 |
| 7,971,162 | B2 | * | 6/2011 | Wood             | 716/100 |
| 2009/0210832 | A1 |  | 8/2009 | Wood             |         |

* cited by examiner

*Primary Examiner* — Leigh Garbowski
*Assistant Examiner* — A. M. Thompson
(74) *Attorney, Agent, or Firm* — Joan Pennington

(57) ABSTRACT

A method, system and computer program product are provided for implementing spare latch placement quality (SLPQ) determination in a floor plan design of an integrated circuit chip. A spare latch placement quality (SLPQ) metric data function is defined and compared to a spare latch placement input with a series of calculations performed. The spare latch placement quality (SLPQ) determination is made based upon the compared SLPQ metric data function and the spare latch placement input. Then associated reports including textual and visual reports are generated responsive to the SLPQ determination. In addition, a new spare latch placement can be constructed with an algorithm responsive to the SLPQ determination.

17 Claims, 4 Drawing Sheets

IMPLEMENTING SPARE LATCH PLACEMENT QUALITY DETERMINATION

FIELD OF THE INVENTION

The present invention relates generally to the data processing field, and more particularly, relates to a method, system and computer program product for implementing spare latch placement quality (SLPQ) determination in a floor plan design of an integrated circuit chip.

DESCRIPTION OF THE RELATED ART

In integrated circuit design, such as microprocessor hardware design, it is typical to include unused latching elements which can be utilized in the event of an engineering change order (ECO). These latches are typically referred to as spares since they reside in the design, but are not actually used functionally. From a timing, physical design, and test perspective these spare latches appear similar to latches which are used. The number of spare latches is generally proportional to the robustness of the hardware design. In other words, a new design has a greater chance of late ECOs and therefore more spares are recommended.

Once the spares are inserted into the random logic macro (RLMs) on the integrated circuit chip the spare latches typically are processed through the design methodology without any special attention. This poses a problem for larger or more complex designs since the final physical location of the spare latches may seriously reduce their helpfulness in implementing ECOs. It is common for known floor planning tools to temporarily assign unplaced gates, such the spare latches, in the lower left corner of the floor plan. Since spare latches tend to have limited influence from other netlist objects and typical design metrics, for example, timing, wire length, and the like, it is very possible a placement algorithm could assign the spares in undesirable locations.

For example, consider a very large design where spares happen to reside in the lower-left corner, while the logic which needs them resides in the upper-right corner. It may be practically impossible to make effective use of these spares due to timing, wiring, or other constraints. Therefore it is desirable to determine the quality of spare latch placement as early as possible so that adjustment to improve the placement quality can be made at the most convenient stage in the design cycle.

Currently there are no known good solutions to the problem of determining and communicating the quality of spare latch placement. The simple method of showing the location of all spare latches does not provide enough information for the hardware designer to make an informed decision about the quality of the placement. For example, all spares may exist in the upper-left of the floor plan design, but perhaps that is the best location or maybe it is the worst, there is not enough information in a simple visualization of spare latch placement.

A need exists for an efficient and effective mechanism to implement spare latch placement quality (SLPQ) determination in a floor plan design of an integrated circuit chip. A spare latch placement metric advantageously considers multiple factors.

SUMMARY OF THE INVENTION

A principal aspect of the present invention is to provide a method, system and computer program product for implementing spare latch placement quality (SLPQ) determination in a floor plan design of an integrated circuit chip. Other important aspects of the present invention are to provide such method, system, and computer program product substantially without negative effects and that overcome many of the disadvantages of prior art arrangements.

In brief, a method, system and computer program product are provided for implementing spare latch placement quality (SLPQ) determination in a floor plan design of an integrated circuit chip. A spare latch placement quality (SLPQ) metric data function is defined and compared to a spare latch placement input with a series of calculations performed. The spare latch placement quality (SLPQ) determination is made based upon the compared SLPQ metric data function and the spare latch placement input. Then associated reports, such as textual and visual reports are generated responsive to the SLPQ determination.

In accordance with features of the invention, the SLPQ metric is used to quickly determine the quality of spare latch placement in a hardware design.

In accordance with features of the invention, the hardware design engineer is enabled to make well-informed decisions with respect to the quality of spare latch placement.

In accordance with features of the invention, an algorithm could be applied in continued floor plan processing which uses the newly defined SLPQ metric as an optimization target to improve the quality of spare latch placement.

In accordance with features of the invention, the SLPQ determination for a spare latch is the output of a series of mathematical operations performed on measurements of a plurality of predefined physical and timing attributes of the design with imperially or theoretically derived scaling factors. The result of the SLPQ determination represents the likelihood of a non-spare latch successfully using a particular spare. Alternatively, the SLPQ determination metric can represent the likelihood a spare latch can be successfully used, where it is best to attain a high likelihood of success.

In accordance with features of the invention, the metric used in the SLPQ calculations includes a plurality of metrics, for example, timing information, such as, static timing slack, at points near the spare latch location; wiring distance between a non-spare latch and multiple spare latches; wiring distance between a predefined density of non-spare latches and multiple spare latches, a combination of wire length and timing information; and a clock domain the spare latches are contained within and relationship to surrounding logic.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing spare latch placement quality (SLPQ) determination in a floor plan design of an integrated circuit chip.

Figure 1:
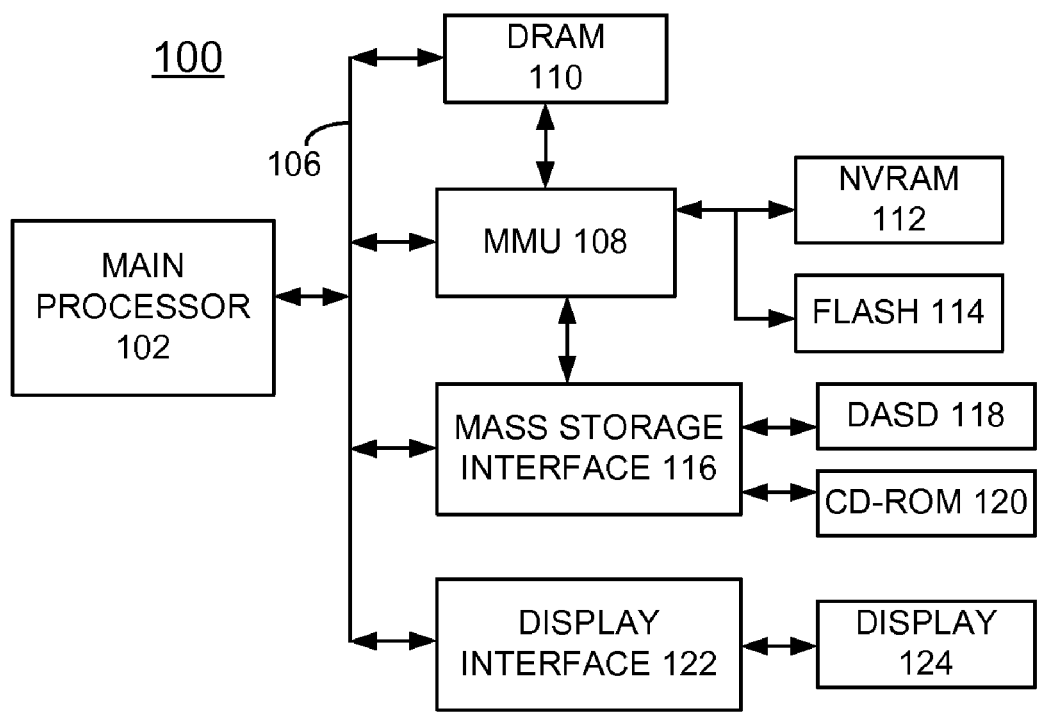
FIGS. 1 and 2 are block diagram representations illustrating an example computer system and operating system for implementing spare latch placement quality (SLPQ) determination in a floor plan design of an integrated circuit chip in accordance with the preferred embodiment.
Figure 2:
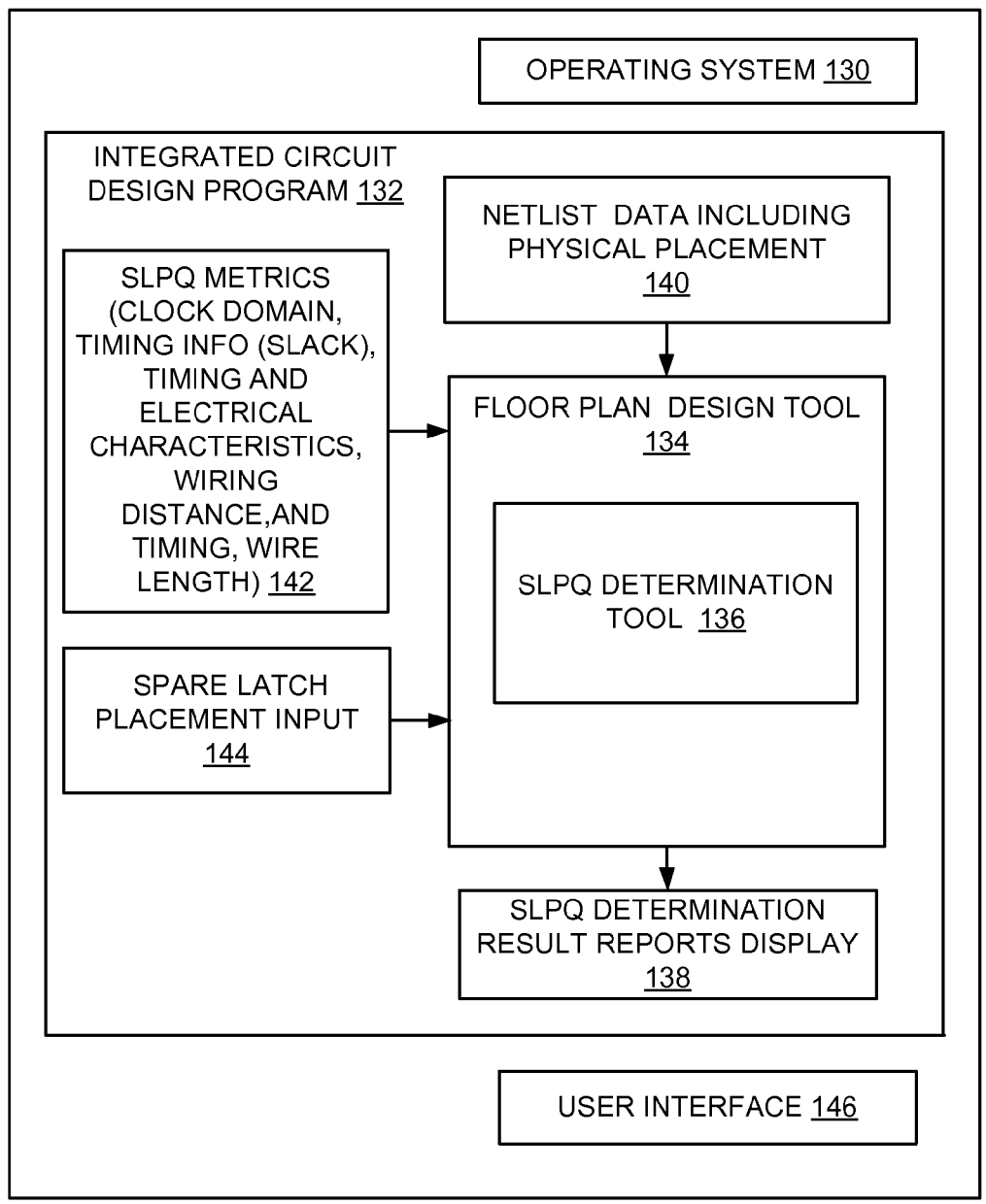

Referring now to the drawings, in FIGS. 1 and 2 there is shown a computer system generally designated by the reference character 100 for implementing spare latch placement quality (SLPQ) determination in a floor plan design of an integrated circuit chip in accordance with the preferred embodiment. Computer system 100 includes a main processor 102 or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer system 100 includes a display interface 122 coupled to the system bus 106 and connected to a display 124.

Computer system 100 is shown in simplified form sufficient for understanding the present invention. The illustrated computer system 100 is not intended to imply architectural or functional limitations. The present invention can be used with various hardware implementations and systems and various other internal hardware devices, for example, multiple main processors.

As shown in FIG. 2, computer system 100 includes an operating system 130, an integrated circuit design program 132, a floor plan design tool 134, a SLPQ determination tool or program 136 of the preferred embodiment, a SLPQ determination results display 138 of the preferred embodiment, netlist data including physical placement 140 describing physical placement of random logic macros (RLMs), a SLPQ metrics input 142 including predefined metric information, such as clock domain, timing information, timing and electrical characteristics, wire distance, and timing, and wiring length; a spare latch placement input 144 describing physical placement of spare latches in the RLMs, and a user interface 146.

In accordance with features of the invention, a spare latch placement quality (SLPQ) metric data function is defined and compared to a spare latch placement input with a series of calculations performed. The spare latch placement quality (SLPQ) determination is made based upon the compared SLPQ metric data function and the spare latch placement input. Then associated reports, such as textual and visual reports are generated responsive to the SLPQ determination. The SLPQ metric is used to quickly determine the quality of spare latch placement in a hardware design. A hardware design engineer is enabled to make well-informed decisions with respect to the quality of spare latch placement.

Figure 3:
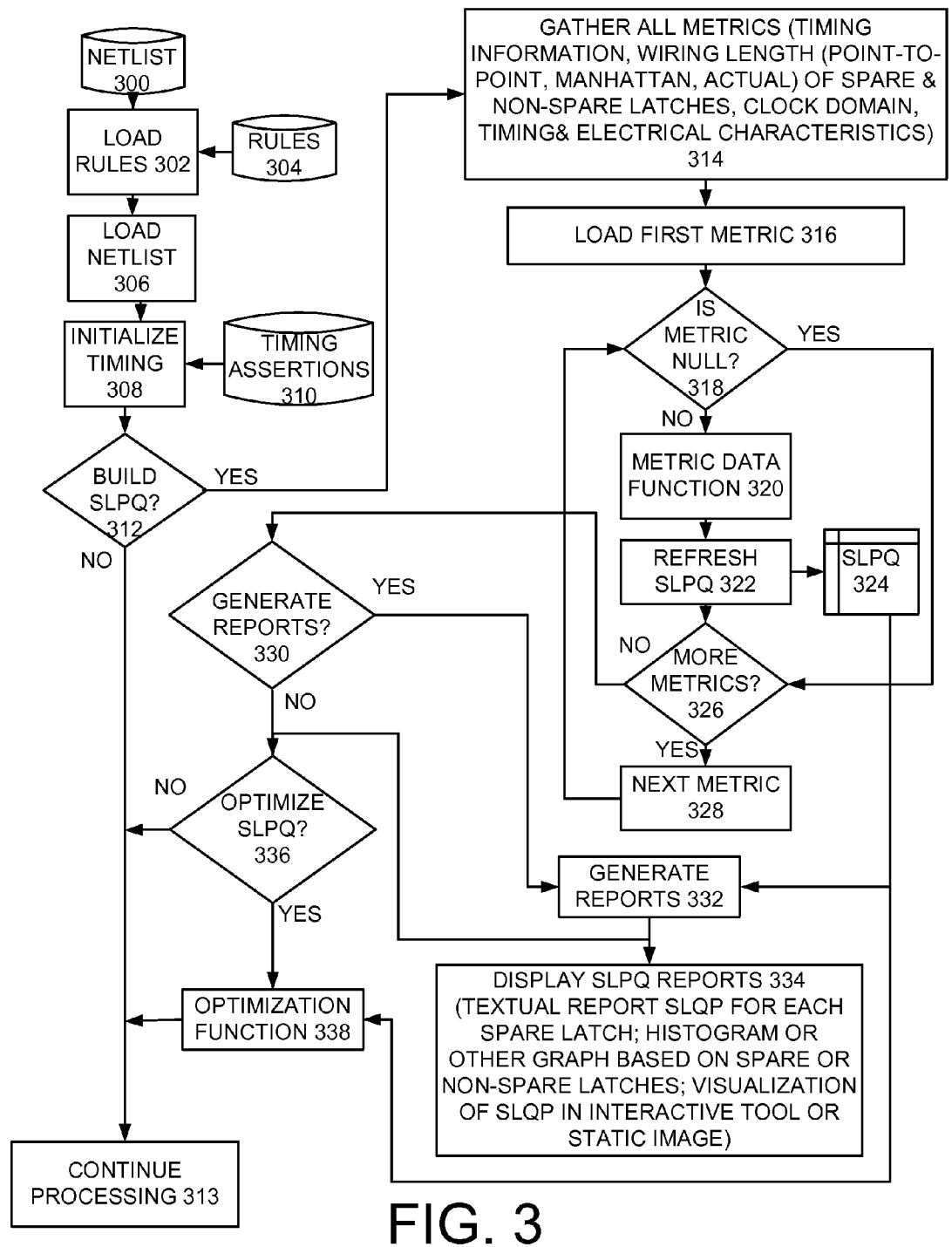
FIG. 3 is a flow chart illustrating exemplary sequential steps for implementing spare latch placement quality (SLPQ) determination in a design of an integrated circuit chip in accordance with the preferred embodiment.

Referring to FIG. 3, there is shown example sequential steps for implementing spare latch placement quality (SLPQ) determination in a design of an integrated circuit chip in accordance with the preferred embodiment. Netlist, such as netlist data 140 is received as indicated at a block 300. Next rules are loaded as indicated at a block 302 from a rules input 304. Netlist data is loaded as indicated at a block 306. Next timing is initialized as indicated at a block 308, receiving timing assertions input as indicated at a block 310.

In accordance with features of the invention, the SLPQ determination for a spare latch is the output of a series of mathematical operations performed on predefined SLPQ metrics or measurements of a plurality of predefined physical and timing attributes of the design with imperially or theoretically derived scaling factors. The result of the SLPQ determination represents the likelihood of a non-spare latch successfully using a particular spare. Alternatively, the SLPQ determination metric can represent the likelihood a spare latch can be successfully used, where it is best to attain a high likelihood of success.

Checking whether a SLPQ determination is to be performed is identified as indicated at a decision block 312. If not, then normal processing of the floor plan design of an integrated circuit chip is provided as indicated at a block 313. When the SLPQ determination is to be performed, a plurality of SLPQ metrics, such as SLPQ metrics 142, are gathered as indicated at a block 314.

In accordance with features of the invention, the metric used in the SLPQ calculations includes a plurality of metrics 142, for example, timing information, such as, static timing slack, at points near the spare latch location; wiring distance between a non-spare latch and multiple spare latches; wiring distance between a predefined density of non-spare latches and multiple spare latches, a combination of wire length and timing information; and a clock domain the spare latches are contained within and relationship to surrounding logic.

The wiring distance metric 142 of non-spare latch to nearest N spares includes a selected one or more of point-to-point, Manhattan, or actual distance. Estimated wire length also includes variation due to congestion or blockage information. The higher the wire length, the lower the likelihood of success.

Also the density of the non-spare latches can be used with the metrics 142 for the SLPQ calculations. Then likelihood of success is divided by other non-spares which compete for same spare. The higher the non-spare density, the lower the likelihood of success.

Also the wire length, or the wiring distance metric 142 of non-spare latch to nearest N spares can be combined with timing to define a maximum distance between a spare and non-spare for a given technology and frequency. For example, if the design runs at 2 GHz, but the minimum possible buffered path delay to a spare prevents a signal from arriving at the spare in less than 500 ps the spare is essentially unusable.

The clock domain metric 142 or which clock domain contains the spare latches is used together with a relationship to surrounding logic and likelihood that the clock domain needs a spare latch for the SLPQ calculations.

For example, one such SLPQ computation follows:

$$\text{SLPQ for a spare latch} = [\text{SUM for } m=1 \text{ to } n \text{ of} \\ (1/\text{slack}(m) * \text{delay-to-spare}(m))]/n$$

where n=the number of non-spare latches for which this spare is one of its X closest spares where closeness is measured in terms of delay from non-spare to spare;

slack(m)=the slack on the m-th particular non-spare latch in the 0 to n latches that find this spare among the X closest spares;

delay(m)=the delay from the m'th particular non-spare latch in the 0 to n latches that find this spare among the X closest spares;

X=number of closest spares to any particular non-spare latch to be considered when assessing the SLPQ of a particular spare.

For the SLPQ calculations, a first metric or combination of metrics is loaded for the SLPQ computation as indicated at a block 316. As indicated at a decision block 318, checking whether the metric is null is performed. In the metric is not null, then the metric data function is processed as indicated at a block 320 and the SLPQ is refreshed as indicated at a block 322, and the SLPQ determination is provided as indicated at a block 324. For example, at blocks 320 and 322, a series of calculations and comparing to a spare latch placement input with the SLPQ metric data function are performed and the spare latch placement quality (SLPQ) determination provided at block 324 is based upon the compared SLPQ metric data function and the spare latch placement input.

Checking for more metrics is performed as indicated at a decision block 326. If yes, then a next metric is loaded as indicated at a block 328 and the SLPQ calculations continue returning to decision block 318. When no more metrics are found at decision block 326, then checking whether reports are to be generated is performed as indicated at a decision block 330. If yes, and after the SLPQ determination at block 324, then reports are generated as indicated at a block 332. As indicated at a block 334, the SLPQ reports are displayed.

Otherwise if no reports are to be generated, or after the reports are generated at block 332, then checking whether the SLPQ should be optimized as indicated at a decision block 336. It the SLPQ should be optimized, then the SLPQ from block 324 is applied to an optimization function processing step as indicated at a block 338, and the optimization function processing of the SLPQ is performed.

Then processing continues as indicated at a block 313. In the continued processing, an algorithm could be applied in continued floor plan processing which uses the newly defined SLPQ metric as an optimization target to improve the quality of spare latch placement.

The SLPQ reports displayed at block 334 enable the hardware design engineer to make well-informed decisions with respect to the quality of spare latch placement. The SLPQ reports displayed at block 334 include, for example, a textual report that is generated indicating SLPQ for each spare latch; a histogram or other mathematical graphs based on spare or non-spare latches; and a visualization of the SLPQ in an interactive tool or static image.

The visualization at block 334 is generated in a variety of ways. One method divides the design into same-sized bins and color with each bin indicates to the SLPQ of latches. This could include a maximum, median, mean SLPQ or some other combination. The size of each bin is arbitrary, but generally should be greater than the size of a single latch and yet small enough to provide clear distinctions between adjacent bins and groups of bins. Such visualization could be provided in a static image or performed dynamically such that interactive movements of latches by the hardware designer dynamically update the visual and the overall change in SLPQ determination at block 324 is quickly visualized. The textual and visual representations can be limited by certain criteria, for example, by clock domain or all such information can be provided in a single report.

Figure 4:
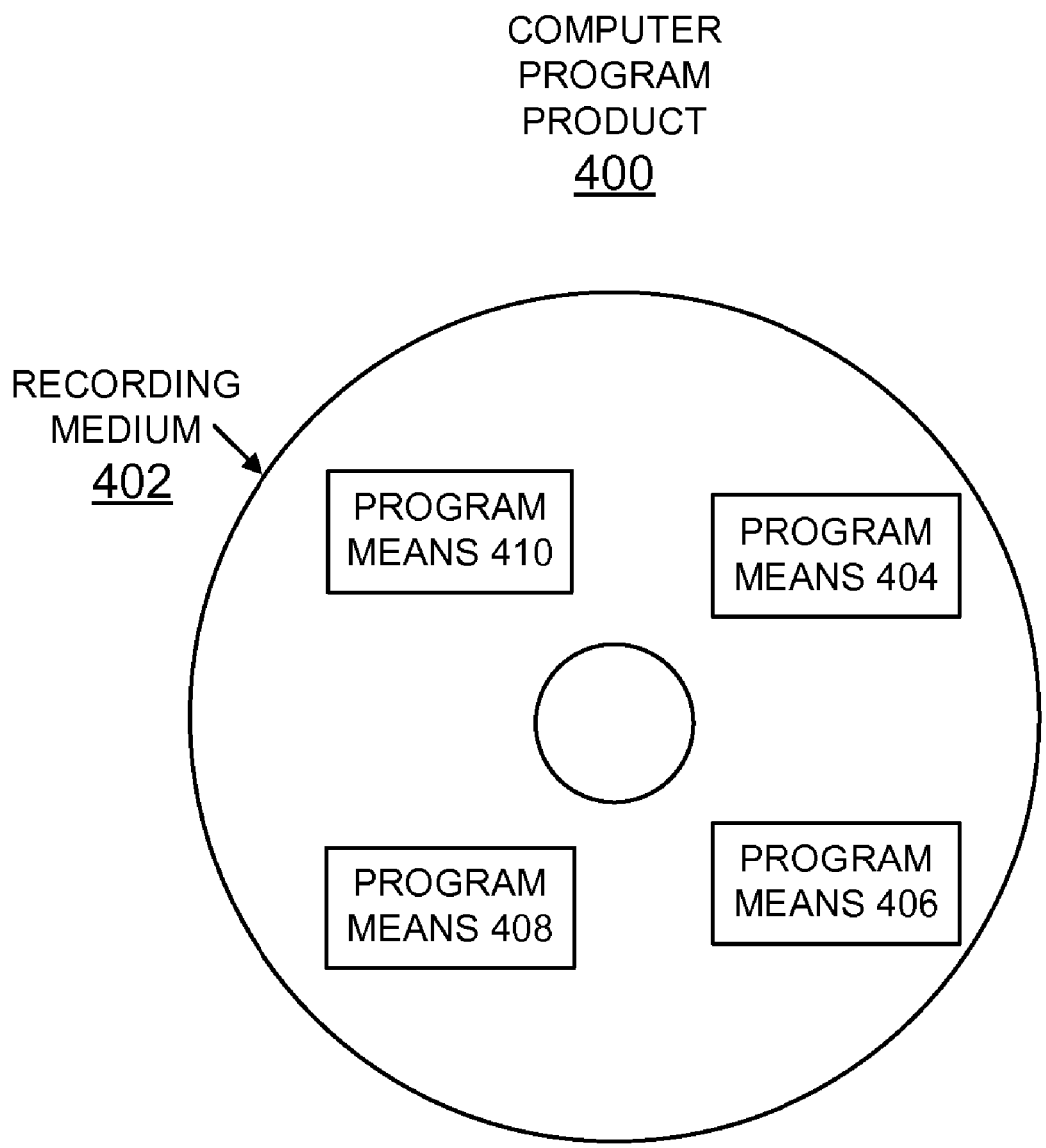
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, or another similar computer program product. Recording medium 402 stores program means 404, 406, 408, 410 on the medium 402 for carrying out the methods for implementing spare latch placement quality (SLPQ) determination in a floor plan design of an integrated circuit chip of the preferred embodiment in the system 100 of FIGS. 1 and 2.

A sequence of program instructions or a logical assembly of one or more interrelated modules defined by the recorded program means 404, 406, 408, 410, direct the computer system 100 for implementing spare latch placement quality (SLPQ) determination in a floor plan design of an integrated circuit chip of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing spare latch placement quality (SLPQ) determination in a floor plan design of an integrated circuit chip in a computer system including a processor comprising:
    using said central processor unit for:
    defining a spare latch placement quality (SLPQ) metric data function;
    performing a series of calculations and comparing to a spare latch placement input with said SLPQ metric data function;
    making the spare latch placement quality (SLPQ) determination for the floor plan design based upon said compared SLPQ metric data function and said spare latch placement input;
    generating a new spare latch placement via an algorithm responsive to the SLPQ determination; and
    generating associated reports responsive to the SLPQ determination.

2. The computer-implemented method as recited in claim 1, wherein generating associated reports responsive to the SLPQ determination includes generating textual reports and generating visual reports.

3. The computer-implemented method as recited in claim 1, wherein performing a series of calculations and comparing to a spare latch placement input with said SLPQ metric data function includes performing calculations using numerical timing information at a spare latch and at locations near the spare latch.

4. The computer-implemented method as recited in claim 1, wherein performing a series of calculations and comparing to a spare latch placement input with said SLPQ metric data function includes performing calculations using structural timing information at a spare latch and at locations near the spare latch.

5. The computer-implemented method as recited in claim 1, wherein performing a series of calculations and comparing to a spare latch placement input with said SLPQ metric data function includes performing calculations using a wiring distance of a non-spare latch and a spare latch.

6. The computer-implemented method as recited in claim 1, wherein performing a series of calculations and comparing to a spare latch placement input with said SLPQ metric data function includes performing calculations using combined structural timing information at a spare latch and at locations near the spare latch and a wiring distance of a non-spare latch and a spare latch.

7. The computer-implemented method as recited in claim 1, wherein performing a series of calculations and comparing to a spare latch placement input with said SLPQ metric data function includes performing calculations using combined numerical and structural timing information and wiring distance of a non-spare latch and a spare latch.

8. A non-transitory machine readable medium tangibly embodying an integrated circuit design computer program product for implementing spare latch placement quality (SLPQ) determination in a floor plan design of an integrated circuit chip in a computer system, said computer program product used in the integrated circuit design process, said integrated circuit design computer program product including a floor plan design tool and a SLPQ determination tool, said integrated circuit design computer program product including instructions executed by the computer system to cause the computer system to perform the steps of:

defining a spare latch placement quality (SLPQ) metric data function;

performing a series of calculations and comparing to a spare latch placement input with said SLPQ metric data function including performing calculations using timing information at a location near a spare latch;

making the spare latch placement quality (SLPQ) determination for the floor plan design based upon said compared SLPQ metric data function and said spare latch placement input;

generating a new spare latch placement via an algorithm responsive to the SLPQ determination; and generating associated reports responsive to the SLPQ determination.

9. The non-transitory machine readable medium tangibly embodying the integrated circuit design computer program product as recited in claim 8, wherein generating associated reports responsive to the SLPQ determination includes generating textual reports and generating visual reports.

10. The non-transitory machine readable medium tangibly embodying the integrated circuit design computer program product as recited in claim 8, wherein performing a series of calculations and comparing to a spare latch placement input with said SLPQ metric data function includes performing calculations using a clock domain of a spare latch.

11. The non-transitory machine readable medium tangibly embodying the integrated circuit design computer program product as recited in claim 8, wherein performing a series of calculations and comparing to a spare latch placement input with said SLPQ metric data function includes performing calculations using a wiring distance of a non-spare latch and a spare latch.

12. The non-transitory machine readable medium tangibly embodying the integrated circuit design computer program product as recited in claim 8, wherein performing a series of calculations and comparing to a spare latch placement input with said SLPQ metric data function includes performing calculations using combined timing information and wiring distance of a non-spare latch and a spare latch.

13. A system for implementing spare latch placement quality (SLPQ) determination in a floor plan design of an integrated circuit chip comprising:

a processor, a non-transitory machine readable medium tangibly embodying an integrated circuit design program tangibly used in the integrated circuit design process, said integrated circuit design program including a floor plan design tool and a SLPQ determination tool, and said processor using said floor plan design tool and said SLPQ determination tool for the floor plan design in the integrated circuit design process, said processor, defining a spare latch placement quality (SLPQ) metric data function;

said processor, performing a series of calculations and comparing to a spare latch placement input with said SLPQ metric data function; said processor performing calculations using a clock domain of a spare latch;

said processor, making the spare latch placement quality (SLPQ) determination for the floor plan design based upon said compared SLPQ metric data function and said spare latch placement input;

said processor, generating a new spare latch placement via an algorithm responsive to the SLPQ determination; and said processor, generating associated reports responsive to the SLPQ determination.

14. The system as recited in claim 13, wherein said processor performing a series of calculations and comparing to a spare latch placement input with said SLPQ metric data function includes said processor performing calculations using a wiring distance of a non-spare latch and a spare latch.

15. The system as recited in claim 13, wherein said processor performing a series of calculations and comparing to a spare latch placement input with said SLPQ metric data function includes said processor performing calculations using combined timing information and wiring distance of a non-spare latch and a spare latch.

16. The system as recited in claim 13, wherein said processor performing a series of calculations and comparing to a spare latch placement input with said SLPQ metric data function includes said processor performing calculations using timing information at a location near a spare latch.

17. The system as recited in claim 13, wherein said processor generating associated reports responsive to the SLPQ determination includes said processor generating textual reports and generating visual reports.

* * * * *